(12) United States Patent
Kobayashi

(10) Patent No.: US 11,230,335 B2
(45) Date of Patent: Jan. 25, 2022

(54) SOLAR PANEL RACK, MOTOR VEHICLE ROOF RAIL

(71) Applicant: Mark M Kobayashi, Alhambra, CA (US)

(72) Inventor: Mark M Kobayashi, Alhambra, CA (US)

( * ) Notice: Subject to any disclaimer, the term of this patent is extended or adjusted under 35 U.S.C. 154(b) by 0 days.

(21) Appl. No.: 16/203,662

(22) Filed: Feb. 19, 2019

(65) Prior Publication Data

US 2020/0262501 A1      Aug. 20, 2020

(51) Int. Cl.
*B62D 65/16* (2006.01)
*H02S 20/30* (2014.01)
*B60L 8/00* (2006.01)

(52) U.S. Cl.
CPC .............. *B62D 65/16* (2013.01); *B60L 8/003* (2013.01); *H02S 20/30* (2014.12)

(58) Field of Classification Search
CPC ......... B62D 65/16; H02S 20/30; B60L 8/003; Y02T 10/7072; Y02E 10/50
See application file for complete search history.

(56) References Cited

U.S. PATENT DOCUMENTS

| | | | |
|---|---|---|---|
| 7,884,569 B2 * | 2/2011 | Ward | H02J 7/35 320/101 |
| 10,439,549 B2 * | 10/2019 | Kurlagunda | H02J 7/35 |
| 2008/0100258 A1 * | 5/2008 | Ward | H01M 10/465 320/101 |
| 2008/0143292 A1 * | 6/2008 | Ward | B60L 58/15 320/101 |
| 2013/0328348 A1 * | 12/2013 | Agnew | B60K 16/00 296/136.03 |

\* cited by examiner

*Primary Examiner* — Bayan Salone

(57) ABSTRACT

My invention is a solar panel rack mounted to 2 longitudinal rails on the roof of a motor vehicle that allows easy slide mounting and removal of the solar panels and rack, without having to climb onto the roof of the motor vehicle and without drilling fastener holes in the solar panels, longitudinal rails, or motor vehicle roof.

1 Claim, 4 Drawing Sheets

101 SOLAR PANEL RACK INSTL

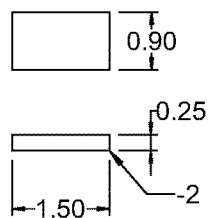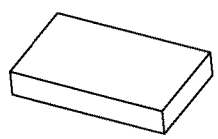
Fig. 1  -2 SHIM
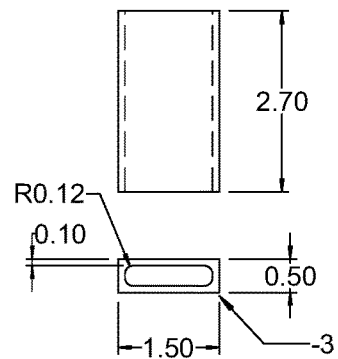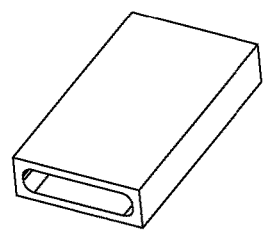
Fig. 2  -3 SHIM RECTANGULAR TUBE

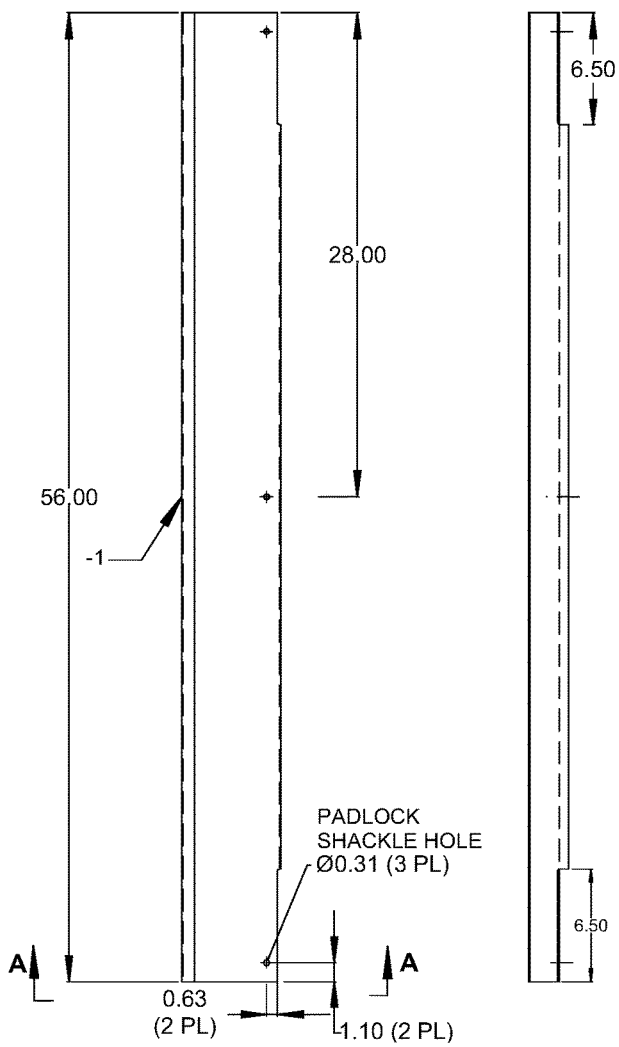
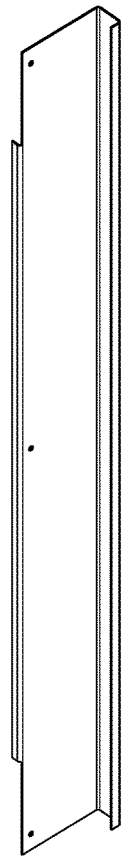
Fig. 3 -1 ISOVIEW (NO SCALE)
Fig. 4 LOOKING DOWN (1:10 SCALE) Fig. 5 SIDE VIEW (1:10 SCALE)
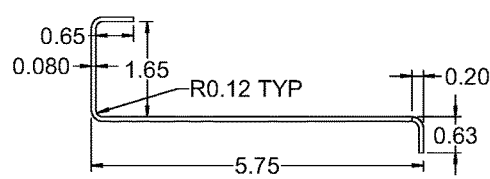
Fig. 6 SECTION A-A (1:3 SCALE) -1 RACK DETAIL

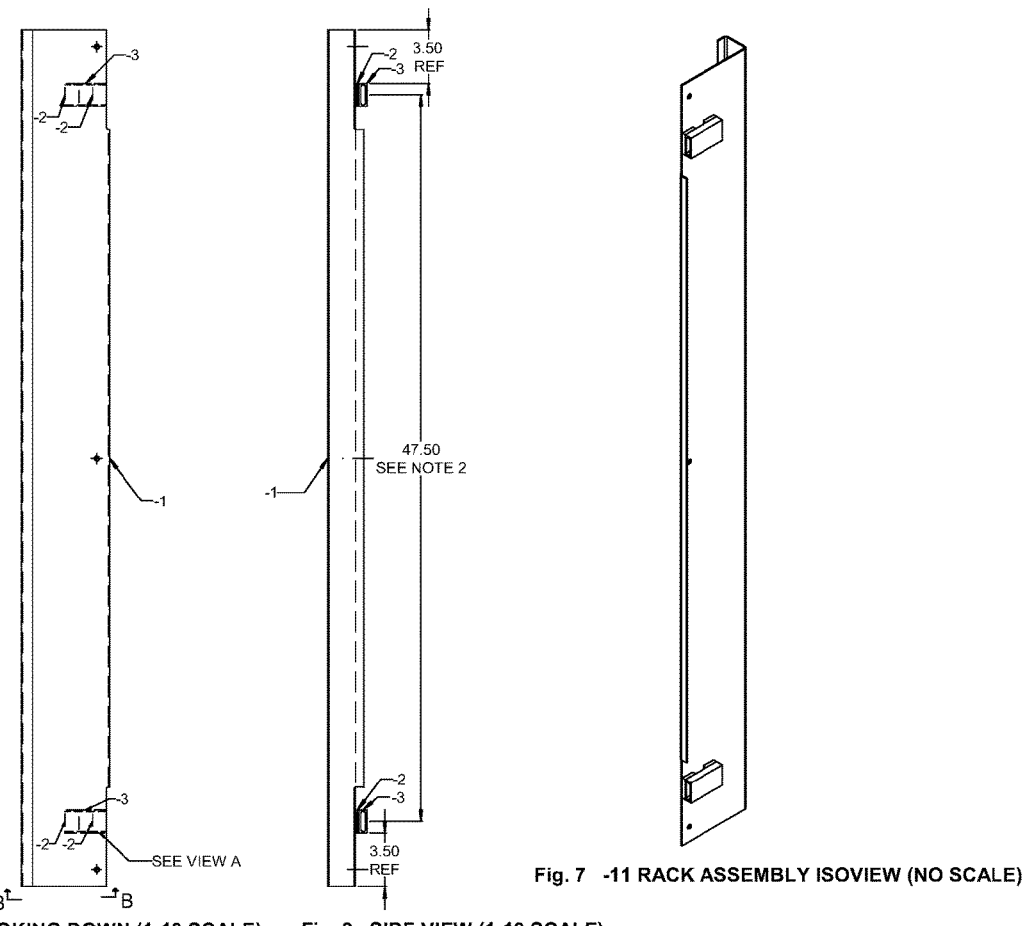
Fig. 7 -11 RACK ASSEMBLY ISOVIEW (NO SCALE)
Fig. 8 VIEW LOOKING DOWN (1:10 SCALE)
Fig. 9 SIDE VIEW (1:10 SCALE)
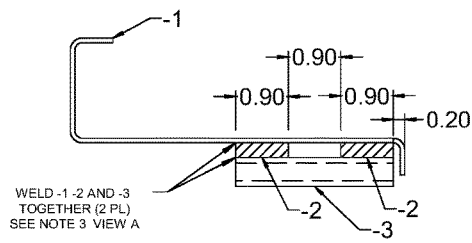
Fig. 10 SECTION B-B (2 PL)
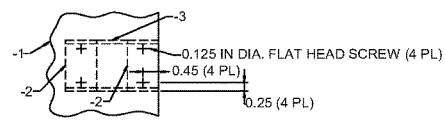
Fig. 11 VIEW A (2 PL)
OPTIONAL ATTACHMENT METHOD
(SEE NOTE 3)

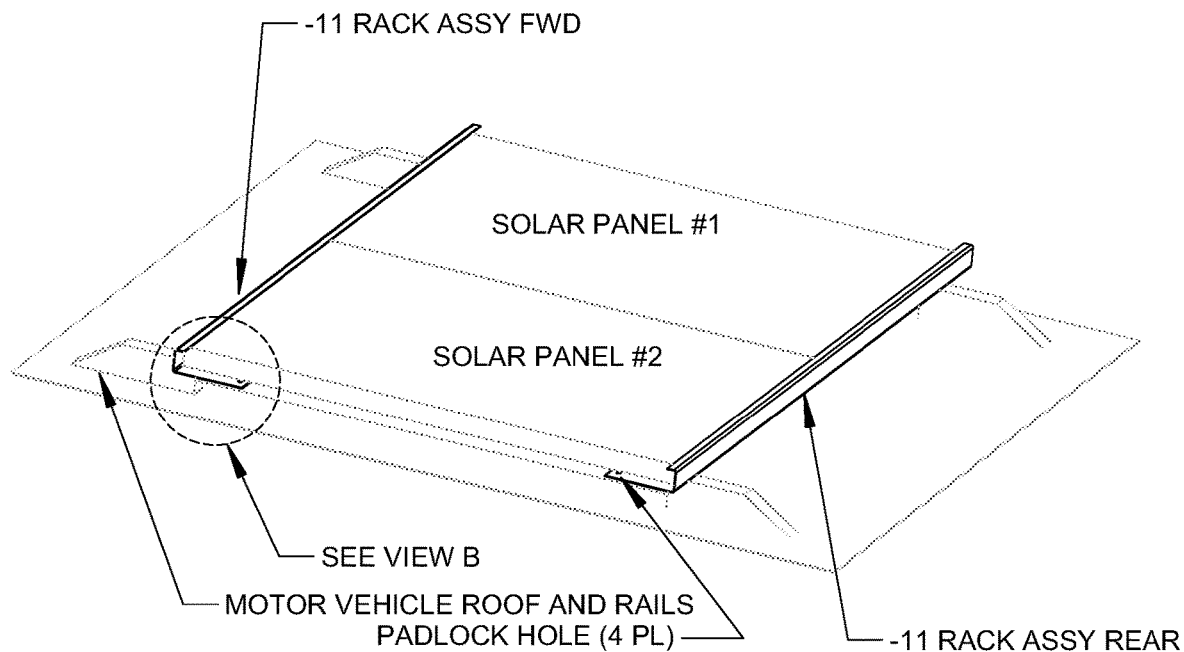
Fig. 12 -101 SOLAR PANEL RACK INSTL
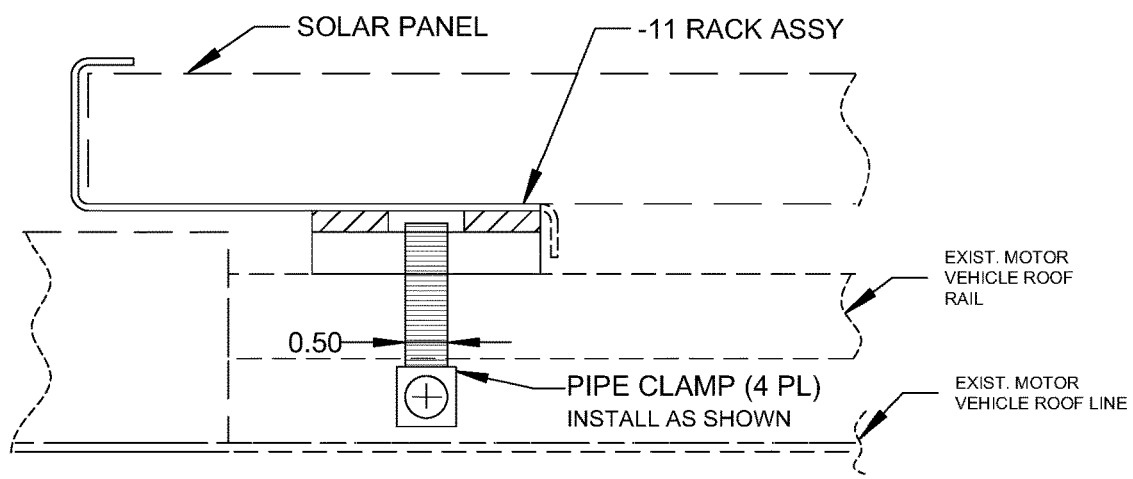
Fig. 13 VIEW B - RACK ASSY ATTACHMENT TO EXISTING MOTOR VEHICLE ROOF RAILS

SOLAR PANEL RACK, MOTOR VEHICLE ROOF RAIL

SUMMARY

The HP2012 solar panel rack allows mounting of solar panels on the roof rack longitudinal rails of a motor vehicle as shown in drawing HP2012 Rev. B Sheet 5, -101 SOLAR PANEL RACK INSTL.

Sheet 1 of the drawing gives the parts list and drawing notes. Sheets 2 and 3 show the 3 different detail parts (-1, -2, -3) making up each -11 solar panel rack assembly and sheet 4 describes how to make the rack assembly using the 3 detail parts. Sheet 5 shows how to attach the rack to the motor vehicle roof longitudinal rails with pipe clamps at the two attachment locations for each of the two -11 rack assemblies, 4 total attachment locations.

BRIEF DESCRIPTION OF THE DRAWING

The views and figures in Drawing HP2012, Solar Panel Rack, Motor Vehicle Roof Rail is described below.

Sheet 1 of the drawing gives the parts list and drawing notes.

FIG. 1 shows the -2 rectangular shim, which is attached to the -1 solar panel rack detail part and used for attachment to the existing motor vehicle roof rail.

FIG. 2 shows the -3 rectangular tube shim, which is attached to the -2 rectangular shims, and used for attachment to the existing motor vehicle roof rail.

FIG. 3 shows an isometric view of the -1 rack detail part.

FIG. 4 is the view of the -1 rack detail part looking down on the motor vehicle roof.

FIG. 5 is the side view of the -1 rack looking from the rear to the front of the motor vehicle.

FIG. 6 is a side view cross-section of the -1 rack looking from the driver's side toward the passenger's side of the motor vehicle FIG. 7 is an isometric view of the -11 rack assembly showing where the -2 rectangular shims and -3 rectangular tube shims are attached to the -1 rack detail part, making up the -11 rack assembly.

FIG. 8 is the view of the -11 rack assembly looking down on the motor vehicle roof.

FIG. 9 is the side view of the -11 rack assembly looking from the rear to the front of the motor vehicle.

FIG. 10 is a side view cross-section of the -11 rack assembly looking from the driver's side toward the passenger side of the motor vehicle and shows how the -2 rectangular shims, -3 rectangular tube shim and -1 rack detail are attached together.

FIG. 11 View A is the view looking down on the motor vehicle roof called out in FIG. 8 and gives an alternative method to the attach the -2 rectangular shims and -3 rectangular tube shim to the -1 rack detail part with fasteners.

FIG. 12 shows an isometric view of how the two -11 solar panel rack assemblies are installed on the existing motor vehicle roof longitudinal rails with two solar panels installed and the padlock installation location to prevent the solar panels from sliding out.

FIG. 13 shows a side view looking from the driver's side to the passenger's side of the motor vehicle of how the two -11 solar panel rack assemblies are attached to the existing motor vehicle roof longitudinal rails with pipe clamps.

DESCRIPTION OF SOLAR PANEL RACK ASSEMBLY AND INSTALLATION

The solar panel rack -1 detail part, shown in FIG. 3-6 consists of a 56 inch wide, 5.75 inch long and 1.65 inch high C-channel cross beam attached to and spanning across existing motor vehicle longitudinal left and right roof rails.

Existing longitudinal roof rails means the longitudinal rails that are made by the motor vehicle manufacturer and are usually already installed on the motor vehicle when purchased, or can be bought and installed from the motor vehicle manufacturer. Therefore, the longitudinal rails do not have to be made to install the solar panel rack.

Each of two -11 cross beam assemblies shown in FIG. 7 are mounted at the forward and rear ends of the solar panels, which slide in between and are trapped in place by the top and bottom flanges of the C-channel cross beams as shown in FIGS. 12 and 13. Each of the two -11 cross beam assemblies are attached to the motor vehicle roof longitudinal rails with 2 pipe clamps, one each near the left and right ends of the cross beam as shown in FIG. 13. No structural modifications, such as drilling fastener holes or saw cuts in the existing car roof, roof rails or solar panels are required for this installation.

The solar panels are restrained from motion in the up and down direction by the top and bottom flanges of the C-channel cross beam, from motion in the forward and rear direction by its vertical flanges and from motion in the left and right side directions by 4 quick release pins or optional padlocks, one each installed to the right and left edges of the solar panels in both cross beams as shown in FIG. 4, view LOOKING DOWN. The solar panel rack can accommodate 2 solar panels, each approximately 26.5 inches wide, 40.0 inches long, 1.6 inches thick and weighing 20 lb., but can also accommodate just one solar panel if desired.

The HP2012-1 C-channel is made of 0.080 in. thick or greater weldable steel or aluminum sheet that can be formed or bent up to the cross-section dimensions shown in FIG. 6. Each -1 C-channel rack detail part is attached to 2 sets of stacked -2 and -3 shims which provides the 2 pipe clamp attachment locations to the motor vehicle roof rails for each of the two -11 cross beam assemblies as shown in FIG. 7-9. The -2 and -3 shims are welded together and also to the -1 C-channel as shown in FIG. 10, but can also be fastened together by bolts or screws if welding is not convenient, as shown in FIG. 11. Each -11 rack assembly made up of the -1 channel, -2 and -3 shims can also be made from machining a plate measuring approximately 56 in.×6 in.×2 in. with end mills, but most of the material would be wasted in this process so it was decided it would be better to use forming, bent up manufacturing instead.

To install the solar panels on the top of the motor vehicle roof, the two -11 cross beam assemblies shown in FIG. 7 are first attached to the motor vehicle roof longitudinal rails as shown in FIGS. 12 and 13. The forward -11 cross beam assembly is lifted and placed across both roof longitudinal rails and is located near the front end of the roof rail. It is fastened in place to the roof rails by tightening the 2 pipe clamps shown in FIG. 13 with a screw driver.

The rear -11 cross beam assembly is then loosely attached to the roof rails with the 2 pipe clamps near the rear end of the roof rail at a distance slightly longer the solar panel length. This permits lifting the first solar panel onto and between both crossbeams and then sliding it between the top and bottom flanges of the C-channel ends.

One quick release pin or padlock should be installed first on the same side of both crossbeams, say the right side, to provide a stop for the first solar panel, location as shown in FIG. 12. The first solar panel is lifted onto the left end of both cross beams with forward and rear ends of the solar panel located in between the top and bottom C-channel flanges of both the forward and rear cross beam and then slid all the way in until it hits the quick release pin or padlock stop. The second solar panel is then lifted and slid into place until it butts up against the first solar panel. The rear crossbeam is then slid forward until the solar panels are installed tightly between the forward and rear crossbeams. The 2 pipe clamps in the rear crossbeam are then tightened to restrain the rear cross beam in place. One quick release pin or padlock is then installed just to the left side of the second solar panel in each crossbeam to prevent the solar panels from sliding out to the left or right sides.

To remove the solar panels from the roof rack, the 2 pipe clamps in the rear -11 cross beam assembly are loosened with a screw driver and the rear cross beam is slid in the rear direction away from the forward cross beam and inch or 2. Remove the quick release pin or padlock on one side, say the left side, in both the forward and rear cross beams. The solar panels can then be slid to the left one at a time until they can be removed from the roof. To remove the forward and rear cross beams from the roof, loosen and take apart the 4 pipe clamp fittings fastening the cross beams to the vehicle longitudinal rails with a screw driver and lift the cross beams off the roof.

I claim the following:

1. A method to make and mount a solar panel rack, and install and remove solar panels on 2 longitudinal roof rails of a motor vehicle roof without having to climb onto the roof and without drilling fastener holes in the solar panels, longitudinal rails, or roof;
  a. Using bent up or formed sheet metal to make the solar panel rack along the entire length or width of the solar panel for secure mounting;
  b. Using pipe clamps to attach the solar panel rack to the longitudinal rails.

* * * * *